(No Model.)
O. W. NORCROSS.
SAW FOR CUTTING STONE.
No. 553,657. Patented Jan. 28, 1896.
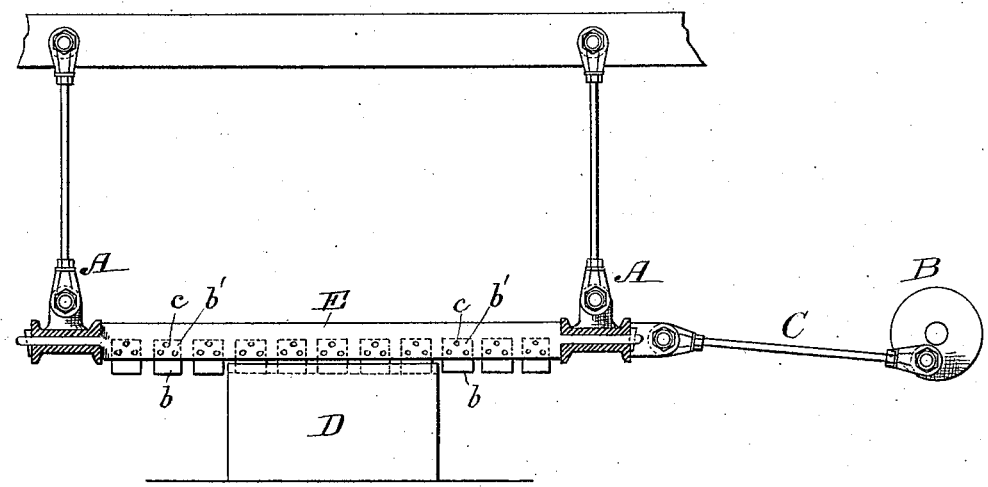
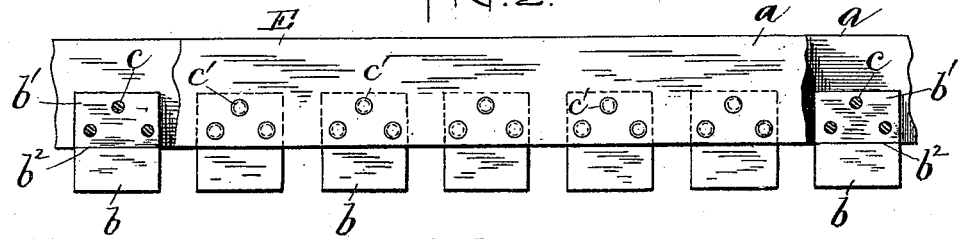
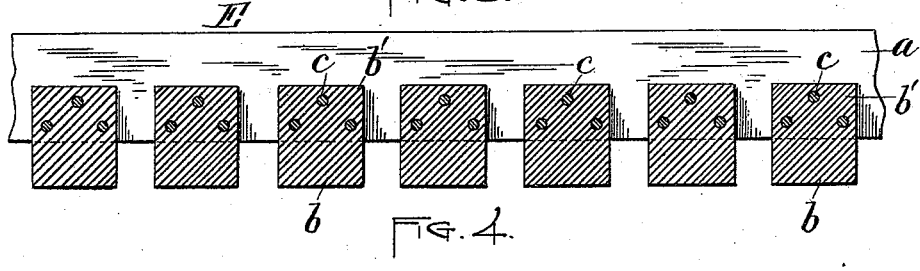
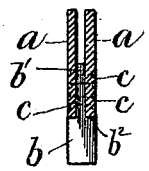
WITNESSES;
W. B. Nourse,
C. Forrest Wesson.
INVENTOR;
Orlando W. Norcross.
By A. H. Barker, Att'y.

UNITED STATES PATENT OFFICE.

ORLANDO W. NORCROSS, OF WORCESTER, MASSACHUSETTS.

SAW FOR CUTTING STONE.

SPECIFICATION forming part of Letters Patent No. 553,657, dated January 28, 1896.

Application filed November 14, 1895. Serial No. 568,915. (No model.)

*To all whom it may concern:*

Be it known that I, ORLANDO W. NORCROSS, of the city and county of Worcester and State of Massachusetts, have invented certain new and useful Improvements in Saws for Cutting Stone; and I do hereby declare that the following is a full, clear, and exact description thereof, reference being had to the accompanying drawings, forming a part of this specification, and in which—

Figure 1 represents so much of a stone-sawing machine as is necessary to illustrate the application of my invention thereto. Fig. 2 represents an enlarged side view of part of my improved saw for cutting stone. Fig. 3 is a central longitudinal section thereof, and Fig. 4 is a transverse or cross section through the saw.

The purpose of my invention is to produce a saw for cutting stone in a rapid and perfect manner, and relates more especially to an improvement upon the saw for cutting stone for which a United States patent was granted to me under date of January 2, 1894, and numbered 511,965.

My present invention consists of a saw composed of two parallel blades placed at a short distance apart and having a series of separate teeth placed between them at a short distance apart along their bottom edges, and said parallel blades and teeth fastened together by means of transverse rivets, as will be hereinafter more fully set forth.

To enable others skilled in the art to which my invention appertains to better understand the nature and purpose thereof, I will now proceed to describe it more in detail.

As my invention relates, as aforesaid, only to the saw of a stone-sawing machine, I have illustrated in the drawings simply the oscillating frame A, which supports the saws, and one of the usual eccentrics B and its rod C, connected with said oscillating frame, the usual vertical feed mechanism connected with the supporting-frame and the mechanism for operating the eccentrics not being shown.

In practice it will be understood that several saws with their eccentrics and rods are employed upon one machine for cutting a block of stone, as D, into several parts at one operation, said cutting operation being performed, as usual, by moving the saws longitudinally back and forth with reciprocating movements over the surface of said stone, and said cutting operation being facilitated by pouring water and sand, emery, or other suitable cutting material around the bottom edges of the saws as they are reciprocated back and forth, as aforesaid.

My improved saw E consists of two vertical parallel blades, $a\ a$, arranged at a short distance apart, and of the separate teeth $b$, each made with a central tongue $b'$, which fits between said parallel blades, with the bottoms of the blades bearing against the shoulders $b^2$ on the teeth at each side of their tongues. The teeth are preferably made of the proper thickness to bring their side faces about flush with the outer faces of the parallel blades when fitted between the same, as is shown in Fig. 4. They are in practice also made about four inches wide and placed about two inches apart along the whole length of the blades, as is shown in Fig. 1. I do not limit myself, however, to said size and position.

The teeth may be fastened in position between the blades by passing studs $c$ transversely through said blades and the tongues $b'$ of said teeth and riveting the ends $c'$ flush with the sides of the blades, or by means of any other suitable fastenings.

By thus making the teeth of the saw, with the part which fits between the parallel blades, thinner than the tooth proper, to form the shoulders $b^2$, and fastening said teeth as aforesaid it will be apparent that said teeth may be held firmly and securely in both a lateral and longitudinal direction, particularly in the latter direction, (by said shoulders,) in which the principal strain comes in the sawing operation. The spaces between the parallel blades and the teeth serve as passages for the water and sand, emery or other cutting material (employed to facilitate the cutting operation) to be fed in directly over the path traversed by the teeth of the saw, and therefore my present invention embraces the same advantage resulting from the use of double parallel blades, as by the use of my former patented saw hereinbefore referred to, with the additional advantage of permitting said cutting material to be deposited on the stock between the teeth directly in the path traversed by said teeth, instead of between the blades (which serve as the cutters in my former patented saw) at one side of the path traversed by said blades, thereby enabling the stock to be cut away more rapidly than by said former patented saw. Then again, by the use of separate teeth in connection with double blades, as described, the width of the cut for different kinds of stone may be varied by removing one set of teeth and replacing the same with others of the proper thickness to produce the desired width of cut, and as one set of teeth become worn away by use a new set may be easily substituted at small expense without necessitating the removal of the double blades from the reciprocating supporting-frame A.

Having described my invention, what I claim therein as new, and desire to secure by Letters Patent, is—

An improved saw for stone cutting machines, comprising in combination the two parallel blades $a$ $a$, separate teeth $b$ having central tongues $b'$ adapted to fit between said blades at a short distance apart and with the bottoms of the blades fitting against shoulders on the teeth at each side of the bases of the tongues, and means for fastening said blades and teeth together, substantially as and for the purpose set forth.

ORLANDO W. NORCROSS.

Witnesses:
A. A. BARKER,
A. J. PARK.